(12) United States Patent
Sun et al.

(10) Patent No.: US 9,141,581 B2
(45) Date of Patent: Sep. 22, 2015

(54) PRODUCTION SCHEDULING MANAGEMENT

(71) Applicants: Gufei Sun, Shanghai (CN); Heng Wang, Shanghai (CN); Wen-Syan Li, Fremont, CA (US)

(72) Inventors: Gufei Sun, Shanghai (CN); Heng Wang, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 448 days.

(21) Appl. No.: 13/624,203

(22) Filed: Sep. 21, 2012

(65) Prior Publication Data

US 2014/0031965 A1 Jan. 30, 2014

Related U.S. Application Data

(60) Provisional application No. 61/675,674, filed on Jul. 25, 2012.

(51) Int. Cl.
*G06F 19/00* (2011.01)
*G06F 17/00* (2006.01)
*G06Q 10/06* (2012.01)
*G06N 3/12* (2006.01)

(52) U.S. Cl.
CPC .......... *G06F 17/00* (2013.01); *G06Q 10/06* (2013.01); *G06Q 10/06316* (2013.01); *G06N 3/12* (2013.01); *G06N 3/126* (2013.01); *G06Q 10/06312* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,586,039 A * | 12/1996 | Hirsch et al. | | 700/95 |
| 5,841,659 A * | 11/1998 | Tanaka et al. | | 700/121 |
| 6,233,493 B1 * | 5/2001 | Cherneff et al. | | 700/95 |
| 6,662,167 B1 * | 12/2003 | Xiao | | 706/13 |
| 6,725,184 B1 * | 4/2004 | Gadh et al. | | 703/2 |
| 7,039,511 B1 * | 5/2006 | Kreuz et al. | | 701/36 |
| 7,120,879 B2 * | 10/2006 | Gutberlet et al. | | 715/853 |
| 7,188,333 B1 * | 3/2007 | LaMotta et al. | | 717/106 |
| 7,653,452 B2 * | 1/2010 | Sauermann et al. | | 700/106 |
| 8,271,118 B2 * | 9/2012 | Pietsch et al. | | 700/104 |
| 2007/0162903 A1 * | 7/2007 | Babb et al. | | 717/154 |
| 2008/0046106 A1 * | 2/2008 | Kumagai | | 700/96 |
| 2008/0154411 A1 * | 6/2008 | Steinbach et al. | | 700/97 |
| 2008/0250420 A1 * | 10/2008 | Berstis et al. | | 718/104 |
| 2010/0161364 A1 * | 6/2010 | Lokowandt et al. | | 705/8 |
| 2010/0242027 A1 * | 9/2010 | Duplessis et al. | | 717/128 |

\* cited by examiner

*Primary Examiner* — Darrin Dunn
(74) *Attorney, Agent, or Firm* — Brake Hughes Bellermann LLP

(57) ABSTRACT

In accordance with aspects of the disclosure, systems and methods are provided for production scheduling management by scheduling production events for each of a plurality of production resources used to manufacture one or more products relative to one or more time intervals while considering constraints related to product dependency trees for each of the one or more products. The systems and methods may include determining the constraints related to the product dependency trees for each of the one or more products, generating one or more potential production scheduling schemes for use of each production resource within the one or more time intervals while considering the constraints related to the product dependency trees for each of the one or more products, and generating a production schedule for the production events within the one or more time intervals based on the one or more potential production scheduling schemes.

19 Claims, 12 Drawing Sheets

PRODUCTION SCHEDULING MANAGEMENT

CROSS-REFERENCE TO RELATED APPLICATION

This application is a Nonprovisional of, and claims priority to, U.S. Provisional Patent Application No. 61/675,674, filed Jul. 25, 2012, entitled "PRODUCTION SCHEDULING MANAGEMENT", which is incorporated by reference herein in its entirety.

TECHNICAL FIELD

The present description relates to various computer-based techniques for production scheduling management.

BACKGROUND

Generally, manufacturing involves the making of products for sale, e.g., by constructing products from component parts. Once manufactured, the products are often stored as inventory, e.g., in warehouse facilities, and ultimately shipped to retail stores or directly to consumers.

In typical manufactory environments, every product may require multiple resources to be used to generate profits. As many products may use different but possibly shared resources and generate different profits as well as being demanded at different levels, production scheduling is a complex process. Further, production scheduling may be considered an important issue when trying to meet future demand and to analyze profitability. Since many parameters and variables may be introduced in a production scheduling process, decision-making and calculations to develop an efficient solution may be considered difficult. As such, there currently exists a need to optimize processes by which production scheduling is determined.

SUMMARY

In accordance with aspects of the disclosure, a computer system may be provided for production scheduling management including instructions recorded on a computer-readable medium and executable by at least one processor. The computer system may include a production scheduling manager configured to cause the at least one processor to schedule production events for each of a plurality of manufacturing resources used to manufacture one or more products relative to one or more time intervals while considering constraints related to product dependency trees for each of the one or more products. In an implementation, the production scheduling manager may include a production controller configured to retrieve information related to each production resource and evaluate each production event for each production resource to determine the constraints related to the product dependency trees for each of the one or more products, a production coordinator configured to generate one or more potential production scheduling schemes for use of each manufacturing resource within the one or more time intervals while considering the constraints related to the product dependency trees for each of the one or more products, and a production scheduling optimizer configured to generate a production schedule for the production events within the one or more time intervals based on the one or more potential production scheduling schemes for use of each manufacturing resource within the one or more time intervals while considering the constraints related to the product dependency trees for the one or more products.

In accordance with aspects of the disclosure, a computer-implemented method may be provided for production scheduling management. In an implementation, the computer-implemented method may include scheduling production events for each of a plurality of manufacturing resources used to manufacture one or more products relative to one or more time intervals while considering constraints related to product dependency trees for each of the one or more products by retrieving information related to each production resource and evaluating each production event for each production resource to determine the constraints related to the product dependency trees for each of the one or more products, generating one or more potential production scheduling schemes for use of each manufacturing resource within the one or more time intervals while considering the constraints related to the product dependency trees for each of the one or more products, and generating a production schedule for the production events within the one or more time intervals based on the one or more potential production scheduling schemes for use of each manufacturing resource within the one or more time intervals while considering the constraints related to the product dependency trees for the one or more products.

In accordance with aspects of the disclosure, a computer program product may be provided, wherein the computer program product is tangibly embodied on a computer-readable storage medium and includes instructions that, when executed by at least one processor, may be configured to schedule production events for each of a plurality of manufacturing resources used to manufacture one or more products relative to one or more time intervals while considering constraints related to product dependency trees for each of the one or more products. In an implementation, the instructions, when executed by the at least one processor, may be configured to retrieve information related to each production resource and evaluate each production event for each production resource to determine the constraints related to the product dependency trees for each of the one or more products, generate one or more potential production scheduling schemes for use of each manufacturing resource within the one or more time intervals while considering the constraints related to the product dependency trees for each of the one or more products, and generate a production schedule for the production events within the one or more time intervals based on the one or more potential production scheduling schemes for use of each manufacturing resource within the one or more time intervals while considering the constraints related to the product dependency trees for the one or more products.

The details of one or more implementations are set forth in the accompanying drawings and the description below. Other features will be apparent from the description and drawings, and from the claims.

DETAILED DESCRIPTION

Figure 1A:
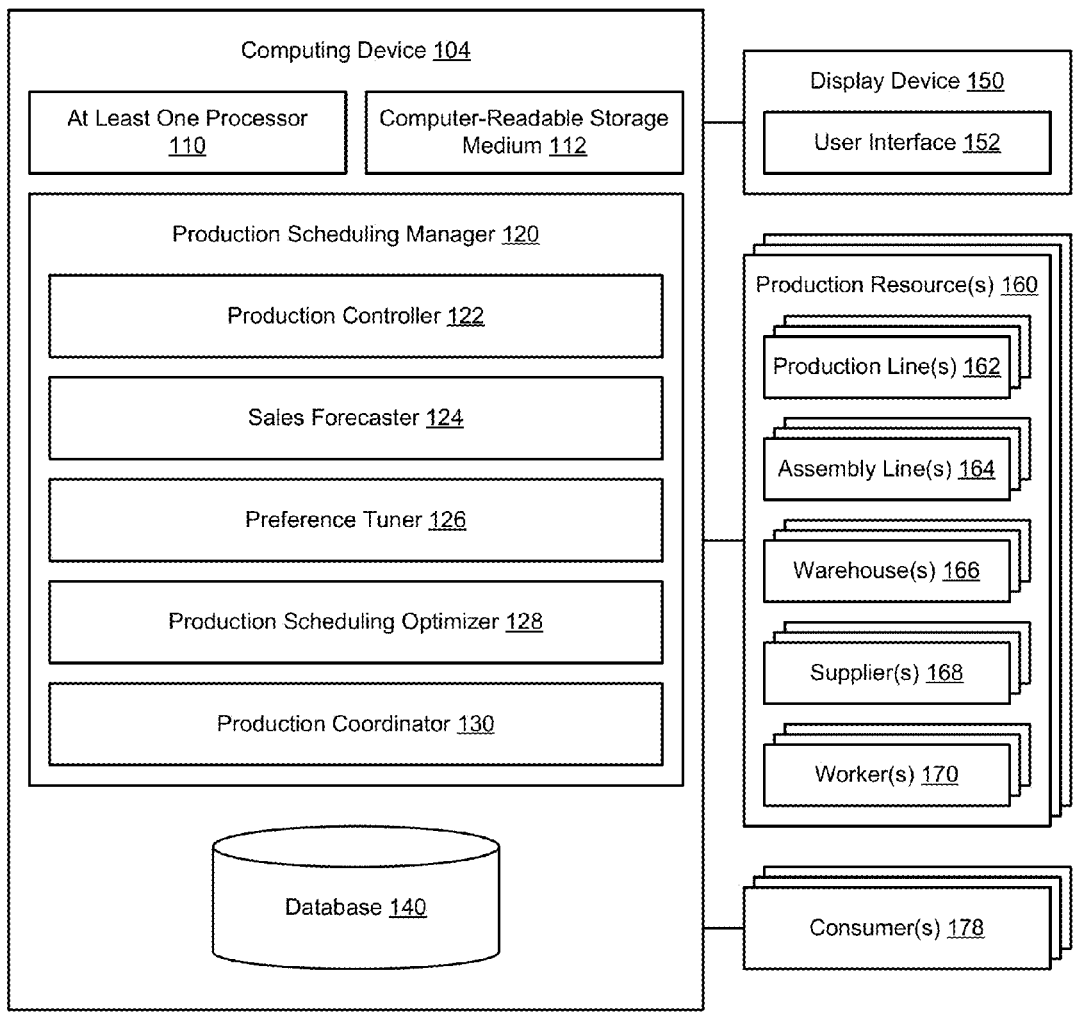
FIGS. 1A-1B are block diagrams illustrating various example systems for production scheduling management, in accordance with aspects of the disclosure.

FIG. 1A is a block diagram illustrating an example system 100 for production scheduling management by implementing a production coordinator to manage production scheduling, in accordance with aspects of the disclosure. In some implementations, production scheduling management may include a divide-and-conquer parallelized scheduling technique for just-in-time manufacturing.

In the example of FIG. 1A, the system 100 comprises a computer system for implementing a production scheduling management system that may be associated with a computing device 104, thereby transforming the computing device 104 into a special purpose machine designed to determine and implement production scheduling process(es), as described herein. In this sense, it may be appreciated that the computing device 104 may include any standard element(s) and/or component(s), including at least one processor(s) 110, memory (e.g., non-transitory computer-readable storage medium) 112, database(s) 140, power, peripherals, and various other computing elements and/or components that may not be specifically shown in FIG. 1A. Further, the system 100 may be associated with a display device 150 (e.g., a monitor or other display) that may be used to provide a user interface (UI) 152, such as, in some examples, a graphical user interface (GUI). In an implementation, the UI 152 may be used, for example, to receive preferences from a user for managing or utilizing the system 100. As such, it should be appreciated that various other elements and/or components of the system 100 that may be useful to implement the system 100 may be added or included, as would be apparent to one of ordinary skill in the art.

In the example of FIG. 1A, the production scheduling management system 100 may include the computing device 104 and instructions recorded on the computer-readable medium 112 and executable by the at least one processor 110. Accordingly, in an implementation, the production scheduling management system 100 may include the display device 150 for providing output to a user, and the display device 150 may include the UI 152 for receiving input from the user.

The production scheduling management system 100 may include a production scheduling manager 120 configured to cause the at least one processor 110 to schedule production events for each of a plurality of production resources 160 used to manufacture or produce one or more products relative to one or more time intervals while considering constraints related to product dependency trees for each of the one or more products. In production related environments, each product may use one or more of the production resources 160, such as one or more production line(s) 162, assembly line(s) 164, warehouse(s) 166, supplier(s) 168, worker(s) 170, etc, to manufacture products and generate profits. It should be appreciated that since many products may require different but possibly shared resources and generate different profits as well as being demanded at different levels, production scheduling comprises a complex process. Further, such processes may be made more complex in that production scheduling may necessitate different cost budgets and investment to improve production levels of some products. As such, production scheduling may be considered an important issue in production and manufacturing environments to meet future demand and to analyze profitability with respect to upfront investment.

In accordance with aspects of the disclosure, each product may comprise one or more assemblies, and each assembly may comprise one or more parts. In various implementations, each product dependency tree may describe a hierarchical arrangement of the one or more assemblies for each product and the one or parts for each assembly used for producing each product. In other various implementations, at least one of the constraints related to the product dependency trees for each product may comprise a part substitution possibility for one or more parts associated with each product. In still other various implementations, at least one of the constraints related to the product dependency trees for each product may comprise a product-part pairing relationship for one or more parts associated with each product. Further, in some implementations, at least one of the constraints related to the product dependency trees for each product may comprise another product dependency tree generated from the product-part pairing relationship for the one or more parts associated with each product.

Further, in accordance with aspects of the disclosure, the products may be divided into one or more product groups according to the product dependency trees for each product, and each product group may be considered independent of each other product group. Moreover, the constraints may be divided into one or more constraint groups according to each product dependency tree for each product, and each constraint group may be considered independent of each other constraint group. These and other aspects of the disclosure are described in greater detail herein.

When constraint(s), such as, for example, part substitution possibilities, product-part pairing relationships, and/or product dependencies, are introduced in a production scheduling process, decision-making and calculation to generate an optimal production scheduling scheme may not be feasible by a manual process or even by a computerized systematic search given the size of search space. As such, aspects of the disclosure provide various production scheduling solutions for what-if analysis of product demand patterns (e.g., forecasting potential production scheduling schemes) and production scheduling algorithms.

In the example of FIG. 1A, the production scheduling manager 120 may include a production controller 122 configured to retrieve information related to each production resource 160 from the database 140 and evaluate each production event for each production resource 160 to determine the constraints related to the product dependency trees for each of the one or more products. In an implementation, each production resource 160 may include one or more of at least one production line 162, at least one assembly line 164, at least one warehouse 166, at least one supplier 168, and at least one worker or group of workers 170. In another implementation, the production controller 122 may be further configured to receive each constraint as an input for modeling as a chromosome, which is further described herein.

In the system 100, the production scheduling manager 120 may be configured to schedule production events and/or operations of the one or more production resources 160, which may include one or more manufacturing facilities and/or or capacities, in reference to one or more associated production lines 162 (e.g., part production lines), assembly lines 164, warehouses 166, suppliers 168 (e.g., parts suppliers, supply-chains, etc.), and workers 170. The production scheduling manager 120 may be configured to schedule production events and/or operations to optimize the one or more production resources 160 in a desired manner, while meeting demand and providing a desired level of availability of products for sale to consumer(s) 178. The production scheduling manager 120 may achieve these goals in a fast, efficient, repeatable manner, and for widely-ranging examples of numbers, types, and job requirements of various production scheduling scenarios, in a manner as described herein.

In the example of FIG. 1A, each production resource 160 may include one or more production resources including, for example, one or more production lines 162, assembly lines 164, warehouses 166, suppliers 168, and workers 170. For instance, the production line(s) 162 may be used to produce component parts, and the assembly line(s) 164 may be used to assemble such components parts, together, and/or with parts received from supplier(s) 168, into one or more products for sale. In another instance, along such assembly line(s) 164, separate assembly stations may be designated at which worker(s) 170 (e.g., machine operator(s), assembler(s), etc.) perform a repeated assembly task in a highly-specialized and efficient manner, so that the sum total of such assembly tasks results in completion of the product(s) for sale. In an example of such assembly lines, an automobile may be mass produced by assembling various component parts (e.g., frame, windshield, doors, engine, and so on) into a finished automobile.

In an implementation, the production line(s) 162 and assembly line(s) 164 are mere examples of production resources 160 for manufacturing facilities, and other examples may be used. Similarly, the supplier(s) 168 may be considered examples of suppliers ranging from, for example, local wholesalers to providers located in a different parts of the country. In any event, the production scheduling manager 120 may accomplish a goal of dealing with these and other obstacles inherent to a production and manufacturing process, so as to enable production scheduling in such a manner that enables the operator of the production resource(s) 160 to accomplish a desired goal of, for example, optimizing production profitability.

In another implementation, the production scheduling manager 120 may be configured to utilize historical sales data stored in the database 140 for the product(s) to be manufactured to provide a predicted level of demand by the consumer(s) 178. Such forecasts may be short-term and/or long-term and may be made with varying levels of specificity, e.g., with respect to various customer demographics, seasonal variations in sales levels, and various other variables. In specific examples, the production scheduling manager 120 may include and use a sales forecaster 124 to implement regression techniques to make sales forecasts.

Further, the production scheduling manager 120 may use various other types of data stored in the database 140 related to the constraints which may be known or thought to influence, control, and/or otherwise influence events and/or operations of the production resource(s) 160 including manufacturing facilities. For instance, data related to the warehouse(s) 166 may be stored in the database 140, and the warehouse data may describe a current, historical, and/or maximum capacity of the warehouse(s) 166. The warehouse data may describe time and/or cost constraints associated with transporting the product(s). In another instance, data related to the supplier(s) 168 may be stored in the database 140, and the supplier data may describe past, present, and/or predicted data about the each supplier 168, such as, for example, typical delivery times for each part, production capacity of each supplier 168, and cost analysis information including volume discounts (or other costs discounts) associated with each supplier 168. In still another instance, data related to each production line 162 and each assembly line 164 may be stored in the database 140 and may describe data associated with past, present, and/or predicted operations (e.g., production capacity) of each production line 162 and each assembly line 164. For example, such data may include cost(s) in time and/or capital of switching operations from a first product to a second product, since such switches may be necessary and may vary widely in extent to which line operators need to re-tool or otherwise re-configure.

In various implementations, it should be appreciated that any example data is intended merely as non-limiting examples, and any additional and/or alternative types of data may be used in the operations of the production scheduling manager 120. For instance, data may be stored, e.g., in one or more databases 140 and/or elsewhere, regarding an extent to which different products to be produced share the same part(s). In some examples, when automobiles are produced, two different types of cars may use the same braking system and related part(s). Such common usages of parts may reduce a cost associated with switching the assembly line(s) 164 from assembling the first car to assembling the second car.

In some instances, such constraint data may be related to the one or more production resource(s) 160 and may further relate to, or be defined by, the nature and/or type of manufacturing facility and/or products being produced in question. In some instances, the production resource(s) 160 may not utilize assembly line(s) 164, and may instead use dedicated workstations at each of which worker(s) 170 (e.g., machine operator(s), assembler(s), etc.) construct a product for sale from start-to-finish. In some other instances, the production resource(s) 160 may conduct testing (e.g., for quality control) on partially or completely finished products for sale. In these and various other scenarios and situations, the production scheduling manager 120 may be instrumental in allocating associated production resource(s) 160 in one or more time intervals, so as to achieve a desired business goal. In some examples, the production scheduling manager 120 may be configured to select an optimal or near-optimal production schedule scheme or solution that defines specific time intervals during which associated production resource(s) 160 (e.g., the production line(s) 162, assembly line(s) 164, warehouse(s) 166, supplier(s) 168, and worker(s) 170) may be used to obtain a desired result.

In the example of FIG. 1A, the production scheduling manager 120 may include the sales forecaster 124 to forecast a level of demand by the consumer(s) 178. For instance, the production scheduling manager 120 may use historical sales data stored in the database 140 for product(s) or types of product(s) to be manufactured in conjunction with the sales forecaster 124 to provide a predicted level of demand by the consumer(s) 178. Such predictions or forecasts may be short-term and/or long-term, and may be made with varying levels of specificity, e.g., with respect to various consumer demographics, seasonal variations in sales levels, and various other variables. In some examples, the sales forecaster 124 may be configured to use regression techniques and/or algorithms to generate sales forecasts.

In the example of FIG. 1A, the production scheduling manager 120 may include a preference tuner 126 to provide product designations between possible objectives of the production scheduling manager 120. For instance, various constraints may be considered as required or optional, and in scenarios in which profitability should be maximized or optimized, a full utilization may be an option but may not necessarily be a requirement. Therefore, the preference tuner 126 may be used to explicitly or implicitly identify and enforce such differences in the constraints.

In the example of FIG. 1A, the production scheduling manager 120 may include a production scheduling optimizer 128 configured to generate a production schedule for the production events within the one or more time intervals based on one or more potential production scheduling schemes for use of each production resource 160 within the one or more time intervals while considering the constraints related to the product dependency trees for the one or more products.

In the example of FIG. 1A, the production scheduling manager 120 may include a production coordinator 130 configured to generate the one or more potential production scheduling schemes for use of each production resource within the one or more time intervals while considering the constraints related to the product dependency trees for each of the one or more products.

In an implementation, the production controller 122 may be further configured to receive each constraint as an input for modeling as a chromosome by the production coordinator 130. As such, the production coordinator 130 may be further configured to generate the one or more potential production scheduling schemes based on each constraint that is modeled as the chromosome.

In accordance with aspects of the disclosure, the production scheduling manager 120 in conjunction with the production scheduling optimizer 128 and/or the production coordinator 130 may be used to generate at least one production schedule to include a particular production scheduling scheme and/or solution for use in scheduling an actual usage(s) of one or more of the production resources 160 including one or more of the production line(s) 162, the assembly line(s) 164, the warehouse(s) 166, the supplier(s) 168, and the worker(s) or group of workers 170.

As described herein, each product may comprise one or more assemblies, and each assembly may comprise one or more parts. In an implementation, each product dependency tree may describe a hierarchical arrangement of the one or more assemblies for each product and the one or parts for each assembly used for manufacturing each product. In some examples, one or more constraints related to the product dependency trees for each product may include a part substitution possibility for one or more parts associated with each product. In some examples, one or more of the constraints related to the product dependency trees for each product may include a product-part pairing relationship for one or more parts associated with each product. In some other examples, one or more of the constraints related to the product dependency trees for each product may include another product dependency tree generated from the product-part pairing relationship for the one or more parts associated with each product.

Further, in some implementations, the products may be divided into one or more product groups according to the product dependency trees for each product, the constraints may be divided into one or more constraint groups according to each product dependency tree for each product, and each product group and each constraint group may be independent of each other product group and each other constraint group.

As such, in some instances, the production coordinator 130 may be configured to generate the one or more potential production scheduling schemes by limiting the constraints related to the product dependency trees for each of the one or more products to a particular constraint group. Further, in this instance, the production scheduling optimizer 128 may be further configured to generate the production schedule for the production events within the one or more time intervals based on the one or more potential production scheduling schemes generated with the particular constraint group.

In some implementations, input to the production scheduling may include a given or forecasted demand for the product(s) and an optional budget. For instance, if the optional budget is given, a potential production scheduling scheme may be configured to generate an optimal production scheduling scheme. In another instance, if the optional budget is not given, a potential production scheduling scheme may be configured to generate an optimal production scheduling scheme with a lowest cost. Thus, in some examples, the production scheduling manager 120 may be configured with a scheduling algorithm that may provide for effective demand driven production scheduling, in accordance with aspects of the disclosure.

In some implementations, there are types of production financial activities that may impact daily production capacity and production cash flow levels. Some examples include asset related activities for accounts receivable (AR) and liability related activities for accounts payable (AP). For instance, asset related activities for accounts receivable may refer to revenue, income, and/or cash inflow to the cash reserve, and liability related activities for accounts payable may refer to debt, payment, and/or cash outflow from the cash reserve. Some example requirement(s) for production scheduling management may provide for maintaining a desirable or predetermined cash reserve level that may be set in a desired or predetermined manner. Since working capital or cash inflow may only be estimated and not controlled, then as accounts receivables are received as revenue, at least one parameter may be configured that refers to a confidence (or risk) level of a cash inflow estimation strategy.

In the example of FIG. 1A, it should be appreciated that the production scheduling management system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1A. As such, it should be appreciated that conventional functionality that may be considered useful to the system 100 of FIG. 1A may be included as well even though such conventional elements are not illustrated explicitly, for the sake of clarity and convenience.

Figure 1B:
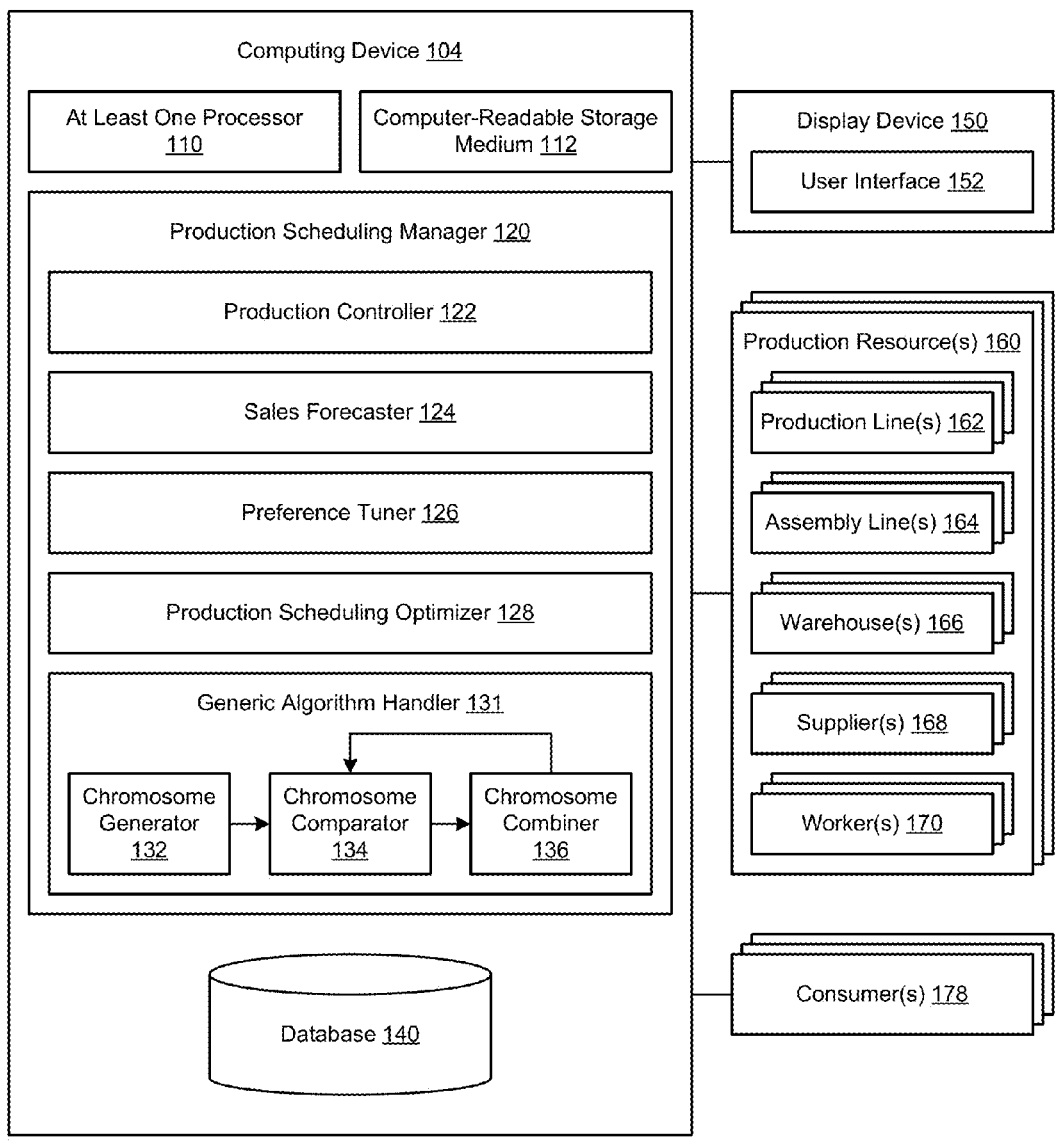

FIG. 1B is a block diagram illustrating another example system 150 for production scheduling management by implementing a genetic algorithm to manage production scheduling, in accordance with aspects of the disclosure. In some examples, as described herein, production scheduling management may include a divide-and-conquer parallelized scheduling approach for just-in-time manufacturing.

In an implementation, the system 150 comprises a computer system for implementing a production scheduling management system that may be associated with the computing device 104 of the system 100 of FIG. 1A. As such, to simplify the following discussion, similar components of the system 150 of FIG. 1B may include the same scope and functionality of the system 100 of FIG. 1A, thereby transforming the computing device 104 of FIG. 1B into a special purpose machine designed to determine and implement production scheduling process(es), as described herein.

In an implementation, the production coordinator 130 of the system 100 of FIG. 1A may be configured as a genetic algorithm handler 131. Therefore, in the example of FIG. 1B, the production scheduling manager 120 of the system 150 may include the genetic algorithm handler 131. In some examples, the genetic algorithm handler 131 may be configured to implement a randomized algorithm approach known as a genetic algorithm (GA), which may refer generally to a computer simulation of Darwinian natural selection that iterates through successive generations to converge toward a best solution in a problem/solution space. Such a genetic algorithm may be used by the system 150 to consider requirements, parameters, and/or constraints into the production scheduling optimization process. Further, the production scheduling management system 150 may be considered capable of recommending and/or selecting "best-available" production scheduling schemes, as described herein.

In the system 150, the genetic algorithm approach may be implemented, for example, by creating one or more "chromosomes" representing a possible solution to the problem of generating a production scheduling scheme. Specific examples of such production scheduling chromosomes are described herein. However, generally speaking, it should be appreciated that such production scheduling chromosomes may include one or more potential production scheduling schemes for each production resource 160 based on the production events for each production resource 160.

Further, it should be appreciated that such potential production scheduling schemes may be used to compare each production scheduling chromosomes relative to the production capacity and production cash flow, to thereby output a selected subset of production scheduling chromosomes. Therefore, there may be a single such production scheduling chromosome that may represent a single best production scheduling solution for a given set of production scheduling objectives to thereby maximize and/or optimize profits. However, optimization of potential production scheduling schemes (i.e., production scheduling chromosomes) may be relative to needs of a user and various other factors including constraints, parameters, and/or requirements. In some instances, due to the nature of the genetic algorithms used herein, the production scheduling manager 120 may be configured to find a "best" solution that is close to an optimal solution, even if the actual optimal solution is not identifiable as such.

In this regard, the production scheduling manager 120 may be configured to optimize production scheduling relative to one or more objectives. One such metric may include profitability. For instance, some products may be more profitable than other products, and/or profitability may be enhanced by exhibiting a preference for behaviors associated with increased profitability. On the other hand, other additional or alternative metrics may have value besides pure profitability. For instance, a gain in market share may be a valuable metric to consider.

As such, in an example, the production scheduling optimizer 128 may be configured for tuning preferences to provide designations between possible objectives of the production scheduling manager 120, and it should be appreciated that various factors including constraints, parameters, and/or requirements may be considered to be necessary or optional. For instance, in scenarios in which profitability should be optimized, a full utilization of the genetic algorithm may be an option but may not be a requirement.

The production scheduling manager 120 may be configured to utilize the genetic algorithm via the genetic algorithm handler 131 to create, compare, and combine multiple production scheduling chromosomes in a manner to thereby create a new generation or population of production scheduling chromosomes for evaluation so that a subset thereof may be selected for reproduction and subsequent evaluation. In this way, each generation and/or population of production scheduling chromosomes may tend to converge toward an optimal solution for potential production scheduling schemes. In some examples, the production scheduling optimizer 128 may be configured to select a particular production scheduling solution (i.e., one of the potential production scheduling schemes or one of the production scheduling chromosomes) for use in determining or selecting a best potential production scheduling schemes.

In the example of FIG. 1B, the genetic algorithm handler 131 may include the chromosome generator 132 configured for generating one or more production scheduling chromosomes. In some instances, such production scheduling chromosome generation may occur at random or may include some initial constraints, guidelines, or restrictions. The chromosome generator 132 may be configured to generate an initial population or set of production scheduling chromosomes, which may be evaluated by the chromosome comparator 134 that may be configured for comparing each production scheduling chromosome including the one or more potential production scheduling schemes for use of each production resource 160 within the one or more time intervals based on the production events for each production resource 160. The chromosome generator 132 may be configured to compare each of the plurality of production scheduling chromosomes relative to one or more time intervals while considering the constraints related to product dependency trees for each product, to thereby output a selected subset of the plurality of production scheduling chromosomes, which may preferably represent the best available potential production scheduling scheme. These and various other related aspects are described in greater detail herein.

The chromosome combiner 136 may be configured to receive the selected subset of the plurality of production scheduling chromosomes and may be configured to combine (e.g., crossover and mutate) production scheduling chromosomes of the selected subset of the plurality of production scheduling chromosomes to obtain a next generation (population) of production scheduling chromosomes for output to the chromosome comparator 134, which may then perform another, subsequent comparison therewith of the next generation of production scheduling chromosomes with respect to the constraints related to product dependency trees for each product, as part of an evolutionary loop of successive generations of the plurality of production scheduling chromosomes between the chromosome comparator 134 and chromosome combiner 136. With each successive generation, the new population of production scheduling chromosomes may represent or include possible improved or near-optimal schedule(s). In some implementations, new generations and/or populations may be iteratively created until either an optimal solution is met, or until factors, preferences, and/or requirements are met up to some pre-defined satisfactory level or threshold, or until a pre-determined number of generations is calculated, or until time runs out to compute new generations/populations (at which point a best solution of the current generation may be selected).

The production scheduling optimizer 128 may be configured to monitor the evolutionary loop and to select a selected production scheduling chromosome therefrom for implementation of the production scheduling scheme based thereon. As referenced herein, the selected production scheduling chromosome and/or solution may represent either a best (optimal or near optimal) solution, or may represent a best-available solution. Thus, the production scheduling optimizer 128 may be tasked with determining whether, when, and how to interrupt or otherwise end the evolutionary loop and extract a best, best-available, optimal, or near optimal solution. Then, the production scheduling optimizer 128 may output a selected production scheduling chromosome and/or execute an actual production schedule.

In the example of FIG. 1B, the chromosome combiner 136 may be further configured to combine the production scheduling chromosomes including selecting pairs of production scheduling chromosomes and crossing over portions of each pair of production scheduling chromosomes to obtain a child chromosome of the next generation. In an implementation, at least a portion of the evolutionary loop may be executed using parallel processes in which each generation of production scheduling chromosomes is divided into sub-groups for parallel processing thereof. In this instance, the production scheduling optimizer 128 may be further configured to select the selected production scheduling chromosome after a predetermined number of generations of the evolutionary loop, or after determining that the selected production scheduling chromosome satisfies the constraints to a predetermined extent.

In the example of FIG. 1B, it should be appreciated that the production scheduling management system 150 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1B. As such, it should be appreciated that conventional functionality that may be considered useful to the system 150 of FIG. 1B may be included as well even though such conventional elements are not illustrated explicitly, for the sake of clarity and convenience.

Figure 2:
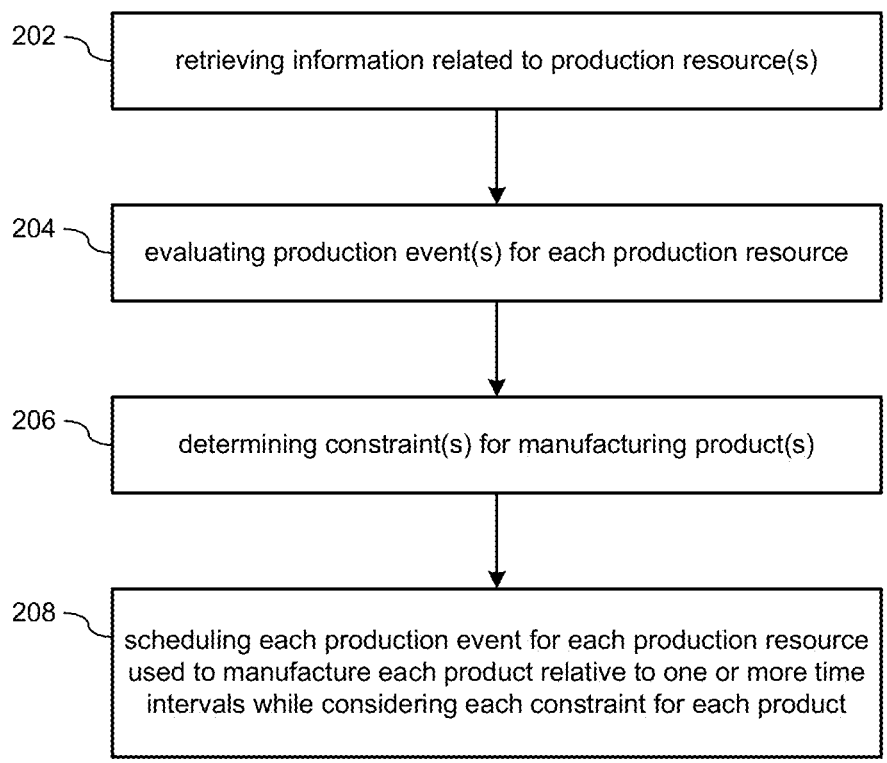
FIGS. 2-5 are process flows illustrating various example methods for managing production scheduling, in accordance with aspects of the disclosure.

FIG. 2 is a process flow illustrating an example method 200 for managing production scheduling, in accordance with aspects of the disclosure.

In the example of FIG. 2, operations 202-208 are illustrated as discrete operations occurring in sequential order. However, it should be appreciated that, in other implementations, two or more of the operations 202-208 may occur in a partially or completely overlapping or parallel manner, or in a nested or looped manner, or may occur in a different order than that shown. Further, additional operations, that may not be specifically illustrated in the example of FIG. 2, may also be included in some implementations, while, in other implementations, one or more of the operations 202-208 may be omitted. Further, in various implementations, the method 200 may include a process flow for a computer-implemented method for managing production scheduling in the system 100 of FIG. 1A and the system 150 of 1B. Further, as described herein, the operations 202-208 may provide a simplified operational process flow that may be enacted by the computer system 104 to provide features and functionalities as described in reference to FIGS. 1A and 1B.

In an aspect of the disclosure, the method 200 of FIG. 2 may be provided for generating a production schedule for one or more production resources 160 used to produce one or more products relative to one or more time intervals. In a production environment, each product uses production resources 160, such as production lines 162, assembly lines 164, warehouses 166, suppliers 168, and/or workers 170.

In the example of FIG. 2, at 202, the method 200 may include retrieving information related to one or more production resources 160 from the database 140. At 204, the method 200 may include evaluating one or more production events for each production resource 160. At 206, the method 200 may include determining one or more constraints for manufacturing one or more products. At 208, the method 200 may include scheduling each production event for each production resource used to manufacture each product relative to one or more time intervals while considering each constraint for each product. In an implementation, one or more product dependency trees related to each product may be considered when scheduling each production event.

Figure 3:
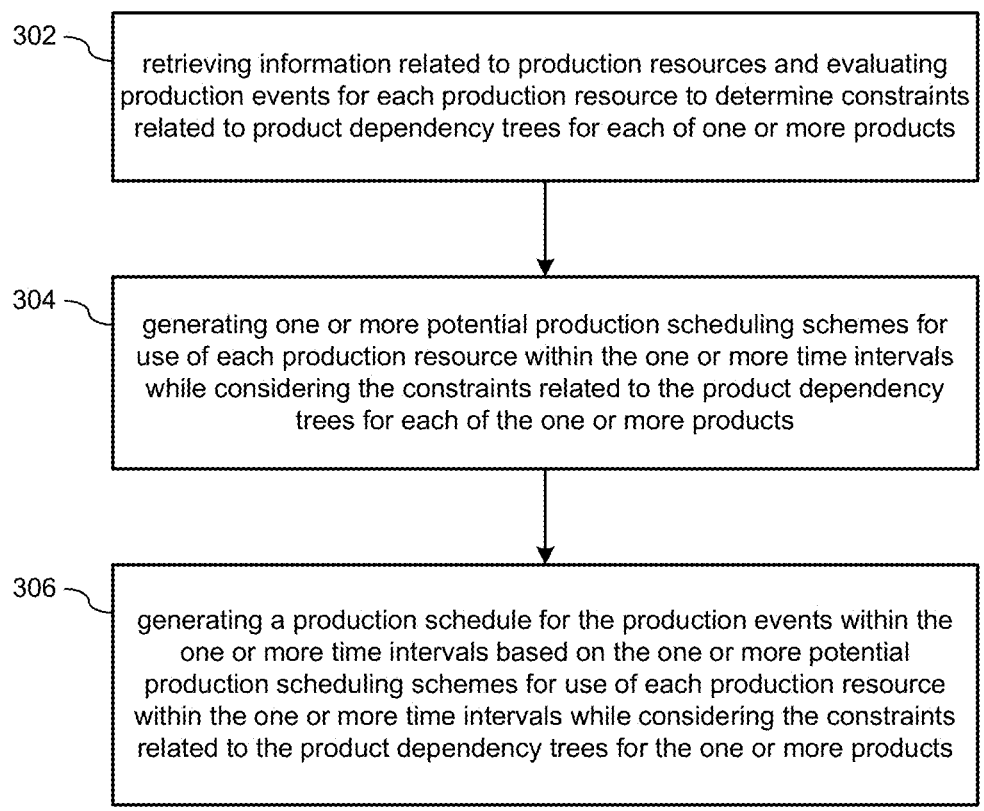

FIG. 3 is a process flow illustrating another example method 300 for managing production scheduling, in accordance with aspects of the disclosure.

In the example of FIG. 3, operations 302-306 are illustrated as discrete operations occurring in sequential order. However, it should be appreciated that, in other implementations, two or more of the operations 302-306 may occur in a partially or completely overlapping or parallel manner, or in a nested or looped manner, or may occur in a different order than that shown. Further, additional operations, that may not be specifically illustrated in the example of FIG. 3, may also be included in some implementations, while, in other implementations, one or more of the operations 302-306 may be omitted. Further, in various implementations, the method 300 may include a process flow for a computer-implemented method for managing production scheduling in the system 100 of FIG. 1A and the system 150 of 1B. Further, as described herein, the operations 302-306 may provide a simplified operational process flow that may be enacted by the computer system 104 to provide features and functionalities as described in reference to FIGS. 1A and 1B.

In an aspect of the disclosure, the method 300 of FIG. 3 may be provided for generating a production schedule for one or more production resources 160 used to produce one or more products relative to one or more time intervals. In a production environment, each product uses production resources 160, such as production lines 162, assembly lines 164, warehouses 166, suppliers 168, and/or workers 170.

In the example of FIG. 3, at 302, the method 300 may include retrieving information related to production resources 160 and evaluating production events for each production resource 160 to determine constraints related to product dependency trees for each of one or more products.

At 304, the method 300 may include generating one or more potential production scheduling schemes for use of each production resource 160 within the one or more time intervals while considering the constraints related to the product dependency trees for each of the one or more products.

At 306, the method 300 may include generating a production schedule for the production events within the one or more time intervals based on the one or more potential production scheduling schemes for use of each production resource 160 within the one or more time intervals while considering the constraints related to the product dependency trees for the one or more products.

Figure 4:
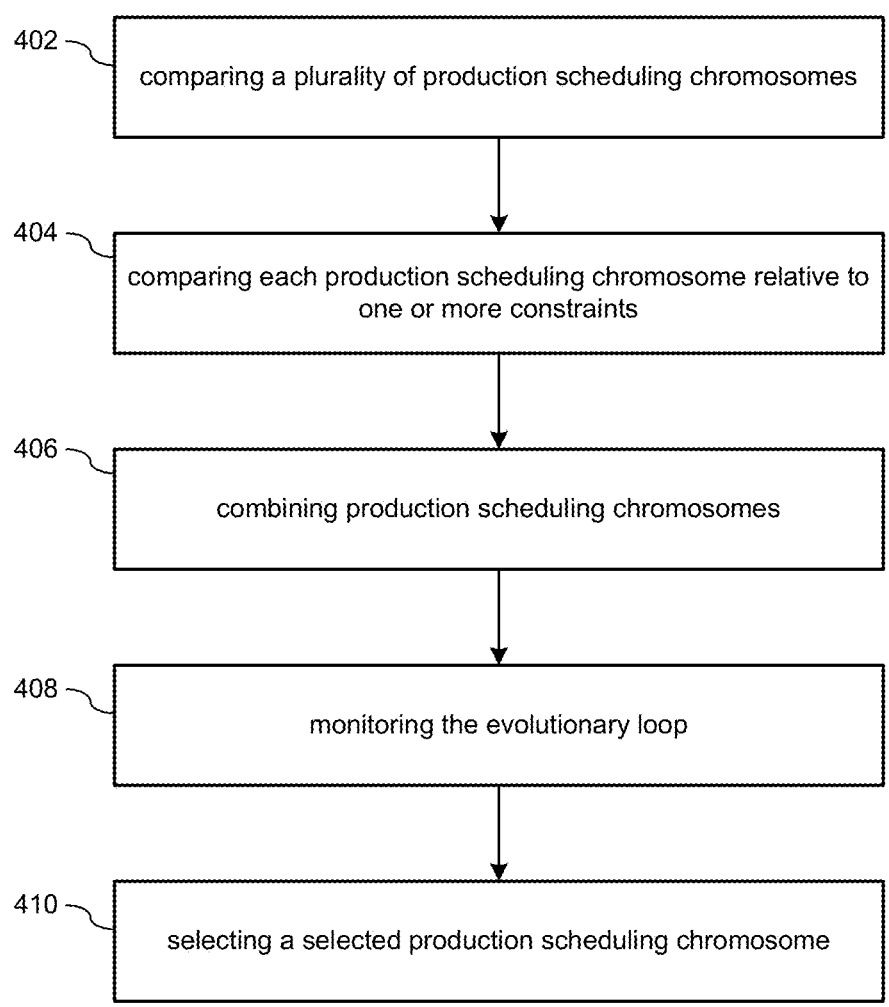

FIG. 4 is a process flow illustrating another example method 400 for managing production scheduling, in accordance with aspects of the disclosure.

In the example of FIG. 4, operations 402-410 are illustrated as discrete operations occurring in sequential order. However, it should be appreciated that, in other implementations, two or more of the operations 402-410 may occur in a partially or completely overlapping or parallel manner, or in a nested or looped manner, or may occur in a different order than that shown. Further, additional operations, that may not be specifically illustrated in the example of FIG. 4, may also be included in some implementations, while, in other implementations, one or more of the operations 402-410 may be omitted. Further, in various implementations, the method 400 may include a process flow for a computer-implemented method for managing production scheduling in the system 100 of FIG. 1A and the system 150 of 1B. Further, as described herein, the operations 402-410 may provide an expanded operational process flow for operation 210 of method 200 of FIG. 2 that may be enacted by the computer system 104 to provide features and functionalities as described in reference to FIGS. 1A and 1B.

In an aspect of the disclosure, the method 400 of FIG. 4 may be provided for generating one or more potential production scheduling schemes for each production resource 160 based on the production events for each production resource 160 and the budget patterns for each production budget 180.

In the example of FIG. 4, at 402, the method 400 may include comparing a plurality of production scheduling chromosomes, wherein each production scheduling chromosome may include one or more potential production scheduling schemes for use of each production resource 160 within the one or more time intervals while considering one or more constraints related to product dependency trees for one or more products.

At 404, comparing each production scheduling chromosome relative to the one or more constraints to thereby output a selected subset of the plurality of production scheduling chromosomes.

At 406, the method 400 may include combining production scheduling chromosomes of the selected subset of the plurality of production scheduling chromosomes to obtain a next generation of production scheduling chromosomes for output and for subsequent comparison therewith of the next generation of production scheduling chromosomes with respect to the one or more constraints, as part of an evolutionary loop of the plurality of production scheduling chromosomes.

At 408, the method 400 may include monitoring the evolutionary loop, and at 410, the method 400 may include selecting a selected production scheduling chromosome therefrom for implementation of a production schedule based thereon.

In an implementation, the method 400 may further include combining the production scheduling chromosomes including selecting pairs of production scheduling chromosomes and crossing over portions of each pair of production scheduling chromosomes to obtain a child chromosome of the next generation.

The method 400 may further include executing at least a portion of the evolutionary loop using parallel processes in which each generation of production scheduling chromosomes is divided into sub-groups for parallel processing thereof.

The method 400 may further include selecting the selected production scheduling chromosome after a predetermined number of generations of the evolutionary loop, or after determining that the selected production scheduling chromosome satisfies the one or more constraints to a predetermined extent.

Figure 5:
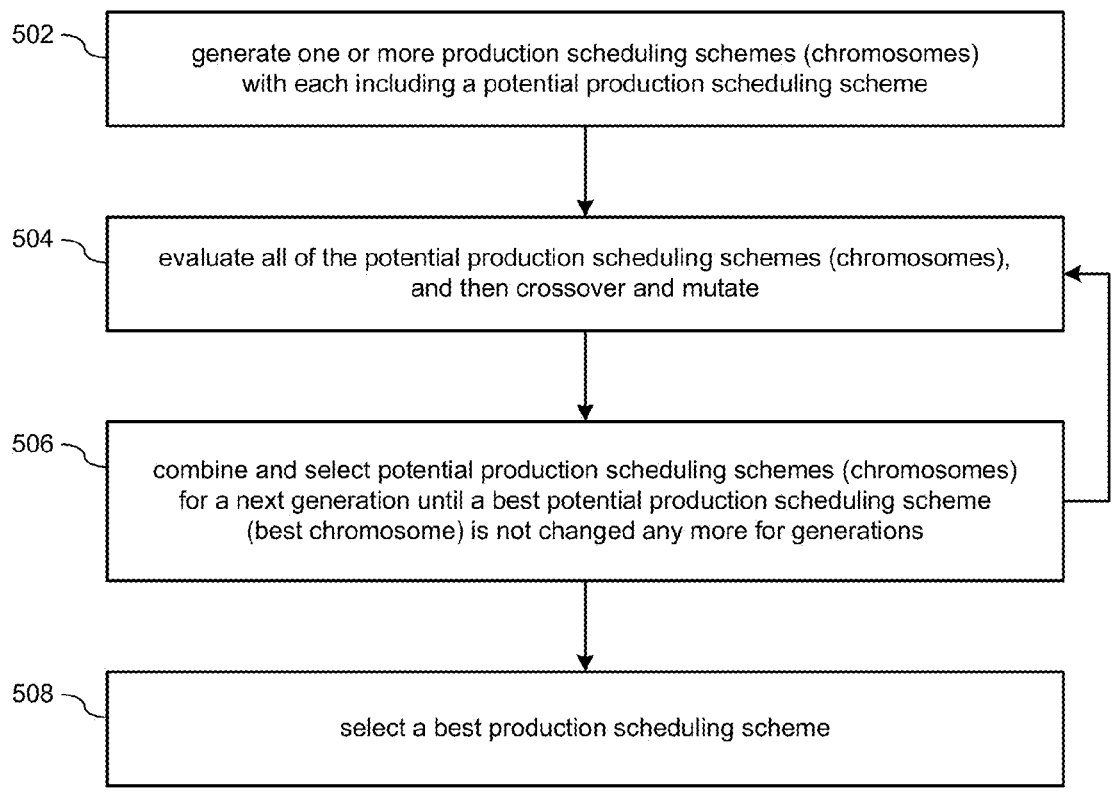

FIG. 5 is a process flow illustrating another example method 500 for managing production scheduling by implementing a forecast algorithm or a genetic algorithm for production scheduling, in accordance with aspects of the disclosure.

In the example of FIG. 5, operations 502-508 are illustrated as separate, sequential operations. However, it should be appreciated that two or more of the operations 502-508 may be conducted in a partially or completely overlapping or parallel manner. Moreover, the operations 502-508 may be implemented in a different order than that shown, and it should be appreciated that additional or alternative operations, not specifically illustrated in the example of FIG. 5, may be included, and one or more of the operations 502-508 may be omitted. Further, as illustrated with respect to the operations 510-508, various ones of the operations 502-508 may be implemented in an iterative, looped, or nested fashion, or otherwise may be implemented in an order and manner consistent with obtaining a desired production scheduling result from one or more of the system 100 of FIG. 1 and the system 150 of FIG. 1B.

At 502, the method 500 may be configured to generate one or more production scheduling schemes (chromosomes), wherein each generated production scheduling scheme (chromosome) includes a potential production scheduling scheme. In an example, the systems 100, 150 may be configured to compare a plurality of production scheduling chromosomes, wherein each production scheduling chromosome includes one or more potential production scheduling schemes for each production resource 160 within the one or more time intervals based on the production events for each production resource 160 and/or while considering constraints related to product dependency trees for each of the one or more products. The systems 100, 150 may be further configured to compare each of the plurality of production scheduling chromosomes relative to the production events and/or the constraints, to thereby output a selected subset of the plurality of production scheduling chromosomes. The systems 100, 150 may be further configured to combine the production scheduling chromosomes of the selected subset of the plurality of production scheduling chromosomes to obtain a next generation of production scheduling chromosomes and for subsequent comparison therewith of the next generation of production scheduling chromosomes with respect to the production events and/or the constraints, as part of an evolutionary loop of the plurality of production scheduling chromosomes. The systems 100, 150 may be further configured to monitor the evolutionary loop and select a selected production scheduling chromosome therefrom for implementation of the production scheduling based thereon.

In the example of FIG. 5, at 504, the method 500 may be configured to evaluate all of the potential production scheduling schemes (chromosomes), and then crossover and mutate. For instance, the systems 100, 150 may be configured to use a forecast algorithm or a genetic algorithm to crossover one or more of the chromosomes by combining the chromosomes in a role of parents to execute a simulation of sexual crossover to obtain a new child chromosome, which may be part of a new generation of chromosomes that may provide further crossover with other members of the same generation as part of an evolutionary loop to optimize the production scheduling process.

Therefore, the systems 100, 150 may be configured to provide a forecast algorithm or a genetic algorithm as a computer simulation of Darwinian natural selection that iterates through various generations to converge toward a best solution in the problem space. Further, in reference to mutation, one of the chromosomes may be randomly selected, then a position (i.e., gene) within the selected chromosome may be selected for mutation, and then the value of the randomly selected position (i.e., gene) may be randomly changed or mutated to produce one or more new characteristics that were not previously available.

At 506, the method 500 may be configured to combine and select potential production scheduling schemes (chromosomes) for a next generation until a best potential production scheduling scheme (best chromosome) is not changed any more for generations. In an example, the operations at 510 and 512 may be repeated or cycled until the best potential production scheduling scheme (best chromosome) is achieved for subsequent selection. For instance, by using a forecast algorithm or a genetic algorithm, a best reasonable production scheduling scheme may be selected or determined for one or more forthcoming production scheduling in a closed circle or loop.

At 508, the method 500 may be configured to select a best production scheduling scheme with an optimized or maximized production schedule. In an example, by using the forecast algorithm or genetic algorithm, a best or most reasonable production scheduling scheme may be selected or determined for at least one forthcoming production schedule in reference to each production resource 160 while considering the optimized or maximized production schedule for each production resource 160.

Figure 6:
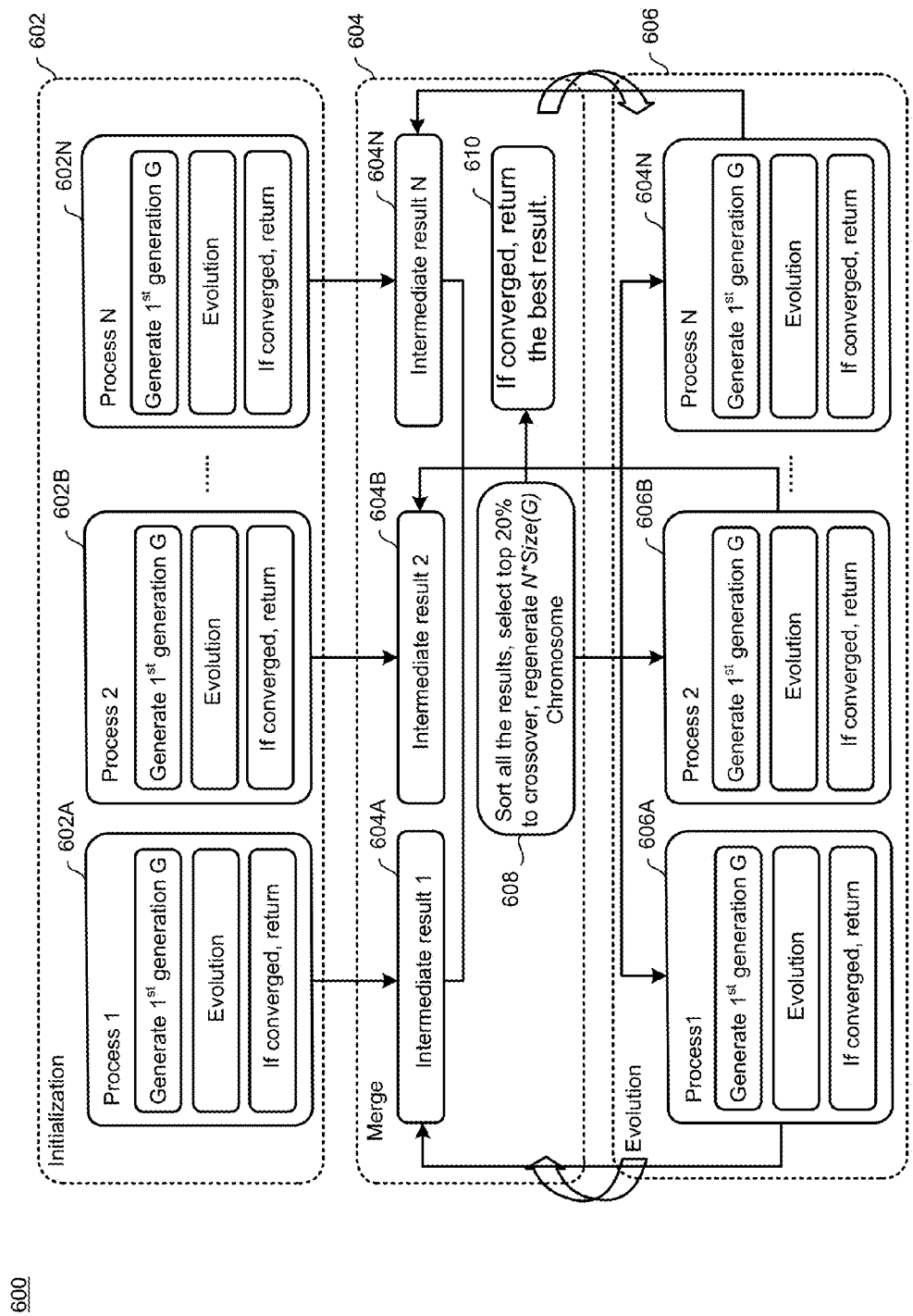
FIG. 6 is a block diagram illustrating an example framework for managing production scheduling, in accordance with aspects of the disclosure.

FIG. 6 is a block diagram illustrating an example framework 600 for managing production scheduling by implementing a forecast algorithm or a genetic algorithm for production scheduling in a manner consistent with methods provided herein. In an implementation, the framework 600 illustrates a parallel framework in which the various operations of the production scheduling optimizer 128 and the production coordinator 130 of FIG. 1A may be parallelized to obtain faster, more efficient results. In another implementation, the framework 600 illustrates a parallel framework in which the various operations of the production scheduling optimizer 128 and the genetic algorithm handler 131 of FIG. 1B may be parallelized to obtain faster, more efficient results.

In this regard, two, three, or more processors may be utilized to divide tasks of a larger computational task so as to obtain computational results in a faster, more efficient manner. Such parallelization may include division of subtasks to be executed in parallel among a specified number of processors, whereupon independent, parallel processing of the assigned subtasks may proceed, until such time as it may be necessary or desired to rejoin or otherwise combine results of the parallel threads of computation into a unified intermediate or final result for the computational task as a whole.

In this regard, it should be appreciated that such parallelization may be implemented using any multi-computing platform in which a plurality of processors, central processing units (CPUs), or other processing resources are available, including network/device clusters. For example, such parallel processing may utilize existing SMP/CMP (Symmetrical Multi-Processing/Chip-level Multi-Processing) servers. Thus, in this description, it should be appreciated that the described processes may each be executed using such a corresponding unit(s) of processing power within any such environment in which multiple processing options are available. For example, it may be appreciated that the at least one processor 110 of FIG. 1 may be understood to represent any two or more of the above-referenced implementations for executing parallel processing, or other platforms for parallel processing, as would be apparent.

In the example of FIG. 6, an initialization stage 602 is illustrated in which "N" processes 602A, 602B, ... 602N are illustrated. As illustrated, each process 602A-602N represents a separate instance of the above-described evolutionary loop of the forecast handler 130 or the genetic algorithm handler 131. Specifically, as shown in each of the processes 602A-602N, a generation "G" of chromosomes may be generated, whereupon evolution of subsequent generations of chromosomes may be conducted, until such time as if and when the production scheduling optimizer 128 may identify a desired type and extent of convergence. As may be appreciated, the chromosome generations of the initial processes 602A-602N may be generated in random fashion. In other example implementations, the initial populations may be generated using one or more techniques designed to provide at least a high level of design which attempts to optimize associated schedules, or at least to eliminate inclusion of unworkable or otherwise undesirable potential schedules.

In a subsequent merge stage 604, intermediate results 604A, 604B ... 604N may be combined, so that, in an operation 608, the combined results may be sorted, and the top 20% (or other designated portion) may be selected for use in creating a subsequent generation of chromosomes. Specifically, the selected portion of a current generation of chromosomes may be utilized to perform the types of crossovers described herein, or other known types of crossovers.

In the example of FIG. 6, individual pairs of chromosomes may be crossed over multiple times, for example, such that a subsequent generation of chromosomes includes N*size (G) chromosomes (i.e., includes a same number of chromosomes as a current generation). For instance, in the example of FIG. 6, since a top 20% of sorted chromosomes may be selected, each pair of chromosomes may be utilized to generate a plurality of new child chromosomes so as to maintain a same number of chromosomes in each generation.

If the overall operation is designated as having converged in conjunction with the operation 608, then the best result (i.e., the chromosome representing the best schedule according to the designated metric of profit maximum and/or utilization maximization) may be returned, as shown in operation 610. Otherwise, an evolution operation 606 may proceed with a re-parallelization of the new, child chromosome population generated in the operation 608.

Specifically, as shown, processes 606A, 606B ... 606N may execute a new, current iteration of processing of the generated population chromosomes, in a manner that is substantially identical to the processes 602A, 602B ... 602N with respect to the initialization operations 602. Subsequently, intermediate results 604A, 604B ... 604N corresponding respectively to the processes 606A, 606B ... 606N may be merged for subsequent sorting, crossover, and regeneration in the context of the operation 608. As may be appreciated, the operations 602, 604, 606 may proceed until convergence is reached at operation 610, and a best or best available result is obtained.

Figure 7:
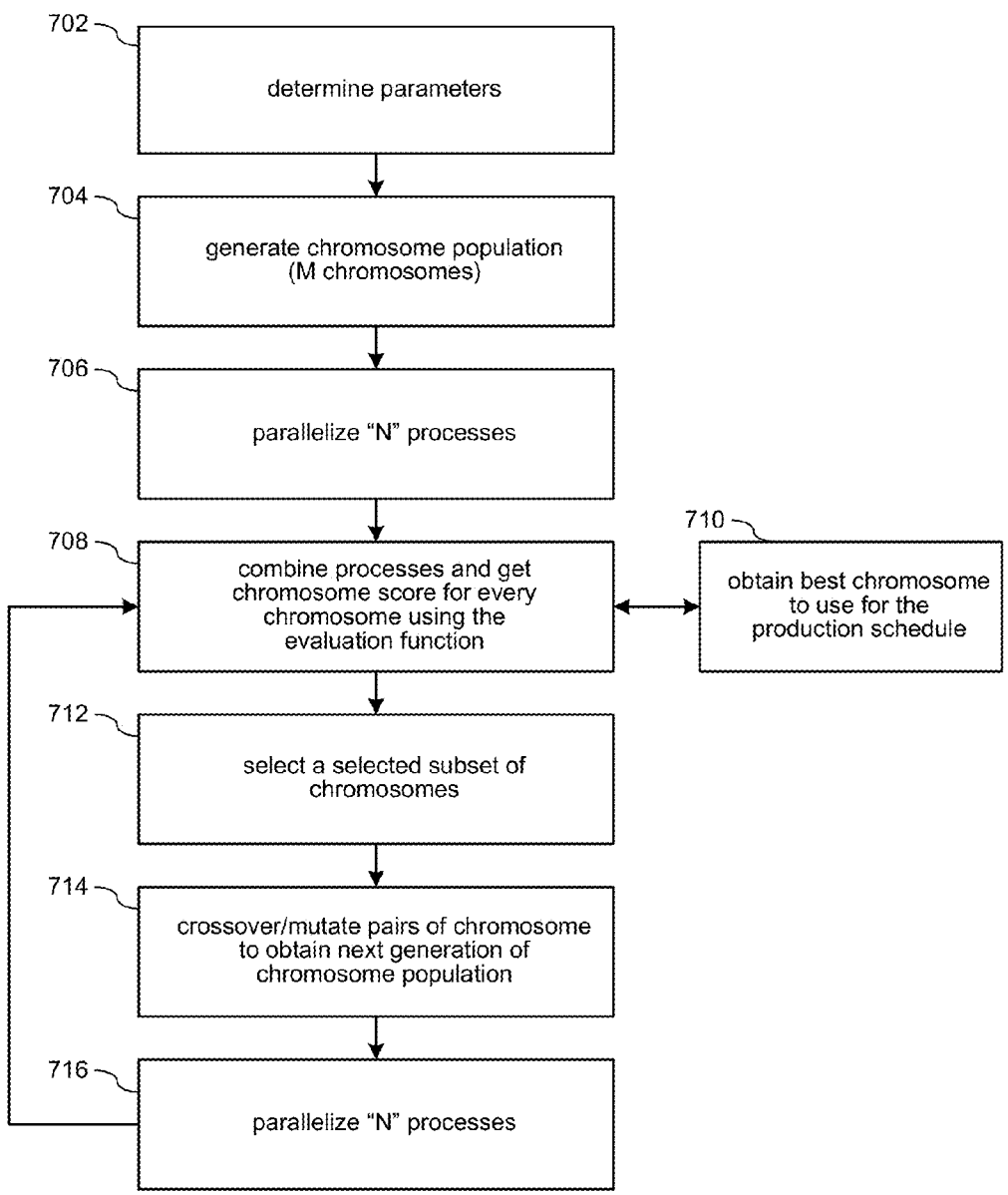
FIGS. 7-8 are process flows illustrating various other example methods for managing production scheduling, in accordance with aspects of the disclosure.

FIG. 7 is a process flow illustrating another example method 700 for managing production scheduling by implementing a forecast algorithm or a genetic algorithm for production scheduling in a manner consistent with reference to the operations of the framework 600 of FIG. 6.

At 702, parameters may be determined. For example, parameters that characterize various portions of the chromosomes to be constructed and/or against which viability of the chromosomes may be judged, as well as a preferences received from a user for performing such judgments, (e.g., generating one or more potential production scheduling schemes for each production resource used to manufacture one or more products relative to one or more time intervals while considering constraints related to product dependency trees for each of the one or more products), may be determined. For instance, as described, a user of the system 100 of FIG. 1 may utilize the UI 152 to identify, designate, provide, or otherwise determine such information.

At 704, an initial chromosome population of "M" chromosomes may be generated. For example, the chromosome generator 128 may generate the first generation G of the processes 602A, 602B ... 602N of FIG. 6.

At 706, "N" processes may be parallelized. For example, FIG. 6 illustrates an example of parallelization of "N" processes, e.g., in the initialization stage 602.

At 708, a chromosome score for every chromosome of the generation may be obtained by combining the various processes and using an appropriate evaluation function. For example, the chromosome comparator 134 may utilize such an evaluation function to associate a score with each chromosome of the generation. If convergence is reached according to one or more pre-determined criteria, then a best available production scheduling chromosome may be selected for use. For instance, if a chromosome receives a sufficiently high score, or if overall operations of the method 700 have provided a designated number of generations of chromosomes and/or have taken a designated total amount of time, then convergence may be understood to have occurred.

Otherwise, at 712, a selected subset of chromosomes may be selected. For example, the chromosome comparator 134 may select a top 20% of chromosomes as scored by the evaluation function.

At 714, pairs of the selected chromosomes may be subjected to crossovers and/or mutation to obtain a subsequent generation of chromosomes. For example, the chromosome combiner 136 may implement a type of crossover or combination in a manner as described herein.

At 716, parallelization of a subsequent "N" processes may proceed. For example, the chromosome comparator 134 may parallelize the end processes 606A, 606B ... 606N as part of the evolution operation 606. In this way, a number of generations of chromosomes may be provided, until a suitable chromosome to use for the production scheduling plan may be obtained at 710.

In accordance with aspects of the disclosure, referring to FIGS. 1A-7, the system 100 may utilize a heuristic-based algorithm for production scheduling such as, for example, with the production scheduling manager 120 utilizing the production coordinator 130 or the genetic algorithm handler 131 for production scheduling by generating potential production scheduling scheme(s) for each production resource 160 used to manufacture product(s) relative to time interval(s) while considering constraint(s) related to product dependency tree(s) for the product(s).

In accordance with aspects of the disclosure, production scheduling is an important step in manufacturing and engineering, where an optimized schedule may have an impact on productivity of a process with respect to efficient manufacturing and lower costs related to part inventories. In manufacturing, one purpose of production scheduling is to minimize production constraints (e.g., time and costs) and optimize margins by configuring production lines and assembly lines for when to produce, with which parts, and on which equipment. As such, in various scenarios, production scheduling may be applied to maximize operation efficiency and reduce costs.

In some implementations, many products may need different but possibly shared parts, generate different profits, and are demanded at different levels. As such, production scheduling is a complex process and challenging problem. Further, in some examples, such processes may be made more complex in that each product may possibly include replaceable parts with different price tag(s). Meanwhile, there may be a strong desire to optimize the margins using the available spare capacity and excess inventory to produce additional products that may achieve higher profits.

In some implementations, with fast-changing marketing environments, the constraints in manufacturing may change rapidly as well. That is, in some examples, a production scheduling manager may need a quick response from a what-if analysis for capacity planning needs to compute all schemes again using the new constraints.

Generally, to perform capacity planning and/or production scheduling for manufacturing industry, genetic algorithms (GA) may be a suitable solution for capacity planning and/or production scheduling due to its flexibility and feasibility. In some examples, a characteristic of genetic algorithms may be configured to decide that it may be easily parallelized to achieve performance improvement. However, in some examples, genetic algorithms (and all other scheduling and optimization algorithms) may suffer from a huge solution search space due to a large number of constraints and possible product-part pairing combinations in a large manufactory system.

In manufacturing industry, a final product may comprise several types of assemblies and those assemblies may depend on lower level components. That is, there may exist a dependency tree for a final product, and there may or may not be sharing parts between several groups of products. In this disclosure, constraints may be divided into several groups according to the product dependency trees. The optimization process for each group of products and constraints may be independent to each other. For genetic algorithm based optimization methods and processes, a smaller number of constraints and outputs may lead to a much smaller solution search space. Thus, aspects of the disclosure make use of independency between product groups and/or constraint groups to optimize performance of genetic algorithm based production scheduling and capacity planning.

In accordance with aspects of the disclosure, the system and methods provided herein are configured to schedule production events for maximal profits while considering various factors and/or constraints including part substitution possibilities, product-part pairing relationships, and/or product dependency trees constructed from the product-part pairing relationships. In various implementations, constraint input may be modeled as a chromosome, and a generic algorithm (GA) may be used to find an optimal production schedule that generates maximal profit. Further, aspects of the disclosure seek to evaluate product dependency and construct dependency trees for each product to reduce the search space for the genetic algorithm. In some examples, such dependency trees may be utilized to improve performance for each scheduling phase including initial scheduling phases and what-if analysis phases, when users explore possible outcomes and potential schemes for different parts that may be used to substitute each other.

In an implementation, input for the system and methods provided herein may include one or more of a plants' capacity, materials, forecasted demands, inventory, dependence between parts, profit calculation model, etc. In an example, as described herein, each product comprises one or more assemblies, each assembly comprises one or more parts, and each product dependency tree describes a hierarchical arrangement of the one or more assemblies for each product and the one or parts for each assembly used for producing each product. In another example, as described herein, at least one of the constraints related to the product dependency trees for each product may include a part substitution possibility for one or more parts associated with each product, a product-part pairing relationship for one or more parts associated with each product, and/or another product dependency tree generated from the product-part pairing relationship for the one or more parts associated with each product.

In another implementation, output for the system and methods provided herein may include a production schedule (e.g., to inform the production facility when to make products, with which staff, and on which equipment and production line). In some examples, as described herein, aspects of the disclosure refer to scheduling production events for each of a plurality of production resources used to manufacture one or more products relative to one or more time intervals while considering one or more constraints related to product dependency trees for each of the one or more products.

Figure 8:
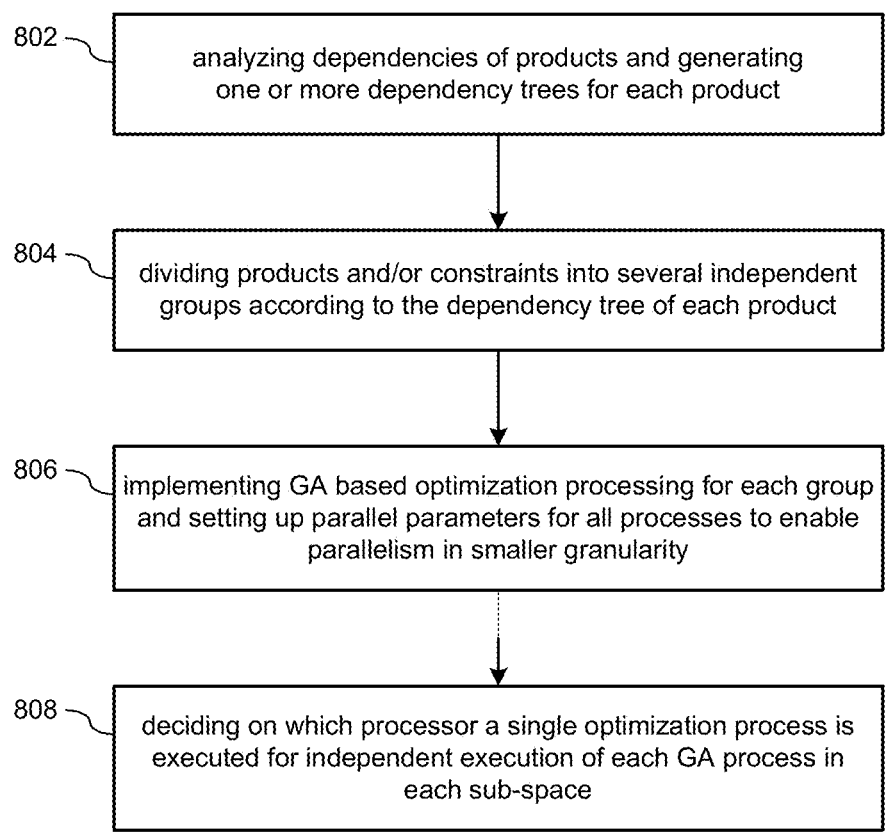

FIG. 8 is a process flow illustrating an example method 800 for managing production scheduling, in accordance with aspects of the disclosure.

In the example of FIG. 8, operations 802-808 are illustrated as discrete operations occurring in sequential order. However, it should be appreciated that, in other implementations, two or more of the operations 802-808 may occur in a partially or completely overlapping or parallel manner, or in a nested or looped manner, or may occur in a different order than that shown. Further, additional operations, that may not be specifically illustrated in the example of FIG. 8, may also be included in some implementations, while, in other implementations, one or more of the operations 802-808 may be omitted. Further, in various implementations, the method 800 may include a process flow for a computer-implemented method for managing production scheduling in the system 100 of FIG. 1A and the system 150 of 1B. Further, as described herein, the operations 802-808 may provide a simplified operational process flow that may be enacted by the computer system 104 to provide features and functionalities as described in reference to FIGS. 1A and 1B.

In an aspect of the disclosure, the method 800 of FIG. 8 may be provided for generating a production schedule for one or more production resources 160 used to produce one or more products relative to one or more time intervals. In a production environment, each product uses production resources 160, such as production lines 162, assembly lines 164, warehouses 166, suppliers 168, and/or workers 170.

In the example of FIG. 8, the method 800 utilizes a dependency based problem partition technique to provide optimal processing to overcome problems related to a large search space. In an implementation, the production scheduling manager 120 may utilize the production controller 122 as a partition controller, and the production scheduling manager 120 may utilize the production coordinator 130 as a job coordinator to implement the method 800 of FIG. 8.

At 802, the method 800 may include analyzing dependencies of products and generating one or more dependency trees for each product. For instance, the partition controller may be configured to analyze the dependencies of products and build up or generate at least one dependency tree for each product.

At 804, the method 800 may include dividing products and/or constraints into several independent groups according to the one or more dependency trees of each product. For instance, the partition controller may be configured to divide the products and/or constraints into several independent groups according to each dependency tree for each product.

Figure 9A:
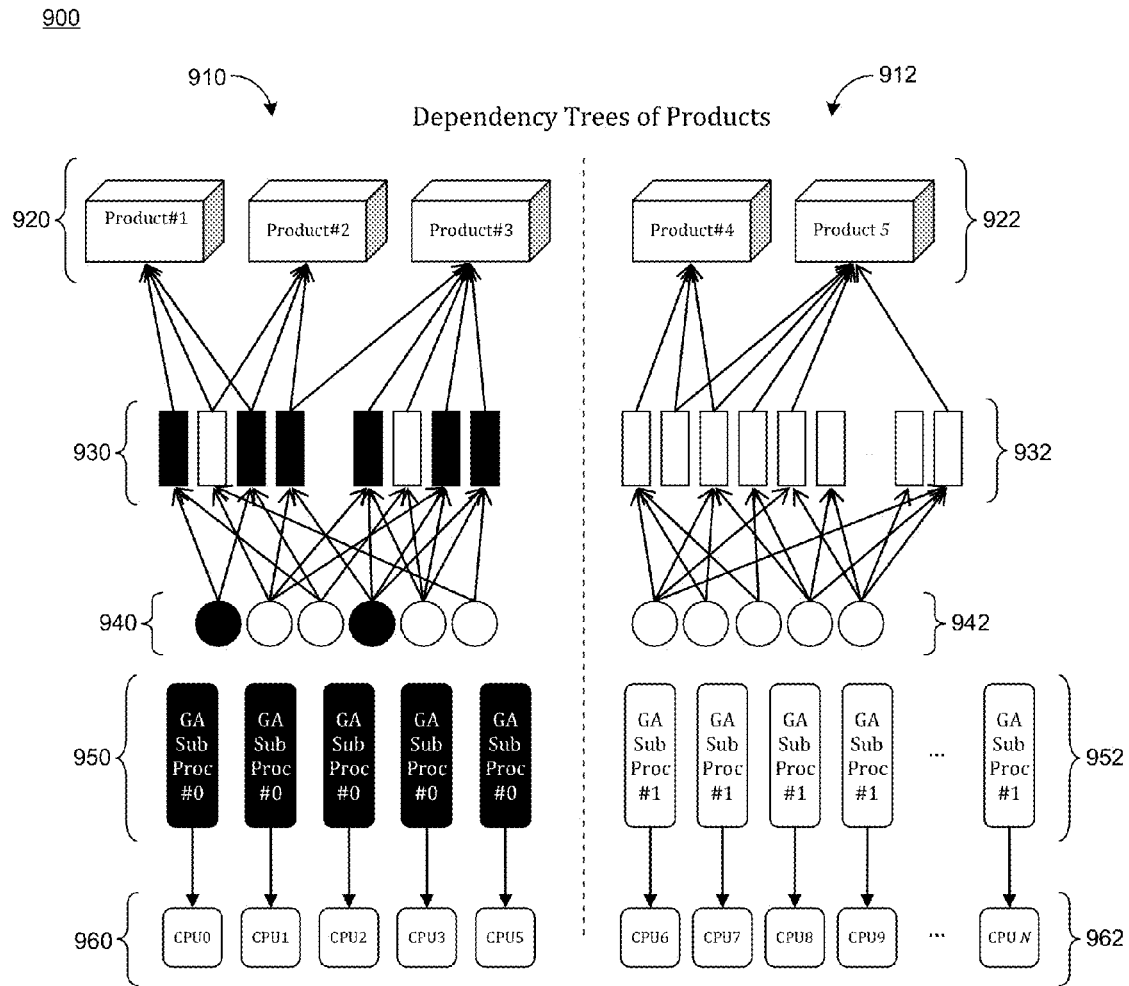
FIGS. 9A-9B shows an example diagram of a product dependency tree, in accordance with aspects of the disclosure.

At 806, the method 800 may include implementing genetic algorithm (GA) based optimization processing for each group and setting up parallel parameters for all processes to enable parallelism in smaller granularity. For instance, FIG. 9A shows an example diagram 900 of product dependency trees 910, 912 of corresponding product groups 920, 922 with each having multiple products (e.g., final product). In an example, each product may include multiple hierarchical dependencies 930, 932 and be comprised of multiple components 940, 942 from one or more different suppliers. Further, as shown in FIG. 9A, in a first run of a production scheduling process and/or a capacity planning process, the job coordinator may be configured to execute (e.g., initiate or start) corresponding genetic algorithm (GA) based optimization processes 950, 952 for each product group 910, 912 and setup parallel parameters for the GA based processes 950, 952 (including GA based sub-processes) to enable parallelism in smaller granularity for parallel processing by a plurality of processors 960, 962 (i.e., CPUs), as shown in FIG. 9A. These and other aspects are described herein.

At 808, the method 800 may include deciding on which processor a single optimization process is executed for independent execution of each genetic algorithm (GA) process in each sub-space. For instance, the job coordinator may be configured to decide or determine on which processors (i.e., CPUs) a single optimization process will be executed. In some instances, the GA process in each sub-space may be configured to run independently of each other. In other instances, since the search spaces of solutions may be significantly reduced, the optimization processes may converge more quickly.

Figure 9B:
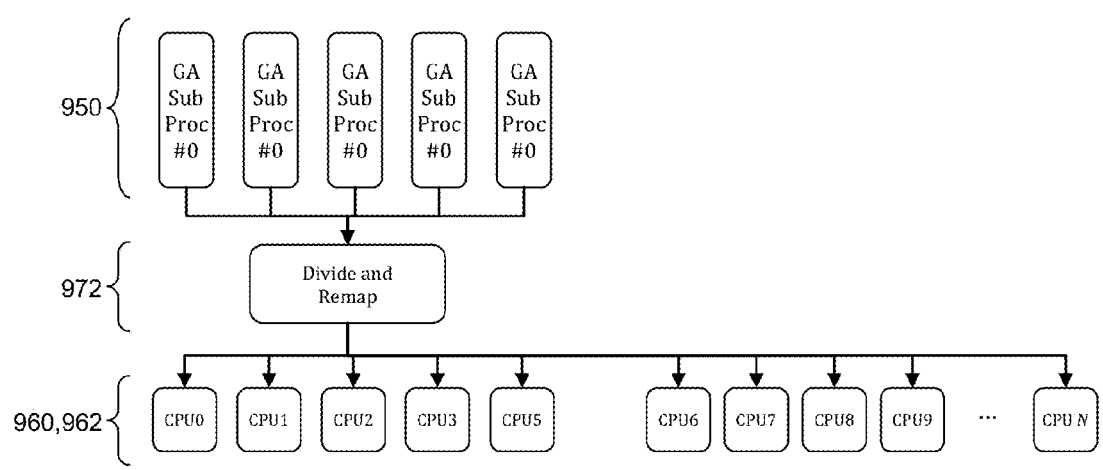

In a case of what-if analysis, the job coordinator may be configured to look up an output of the partition controller and any changed constraints. Then, the job coordinator may be configured to select out any affected groups. For instance, FIG. 9B shows an example diagram 970 of re-mapping 972 in what-if analysis. Referring to FIG. 9A, if some conditions are changed or altered (e.g., darkened blocks of dependencies 930 and components 940), the system may analyze which product 920 and/or intermediate assemblies are affected. Then, referring to FIG. 9B, the GA processes 950 (including GA based sub-processes) related to the affected products and intermediate assemblies may be invoked again. In this instance, the GA processes and sub-processes 950 may be divided and remapped 972 to more threads (i.e., use of all of the processors 960, 962) to fully use system capacity. In some examples, instead of invoking optimization processes for all the products and constraints, the system and methods of the disclosure may be configured to optimize the production scheduling solution and/or the capacity planning solution for only those affected groups of products 920 that may be changed or altered by using new conditions and/or constraints. As such, in these examples, the job coordinator may be configured to divide and remap 972 the optimization processes and sub-processes 950 to all of the processors 960, 962 (i.e., CPUs) available in the system to thereby make full use of computation capacity to thereby improve system efficiency.

Figure 10:
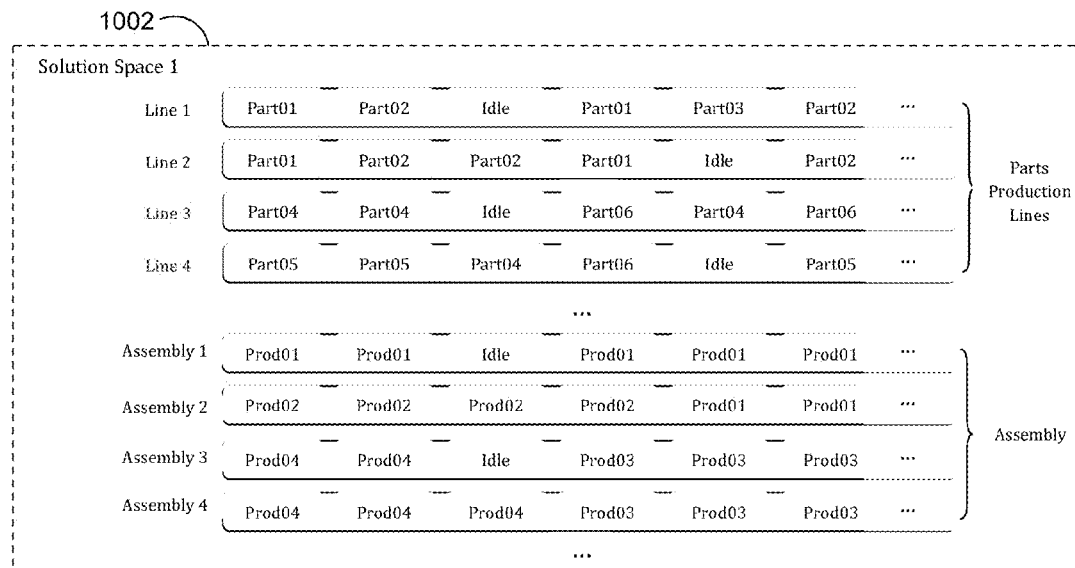
FIG. 10 shows an example chromosome representation of solution spaces, in accordance with aspects of the disclosure.
Figure 10:
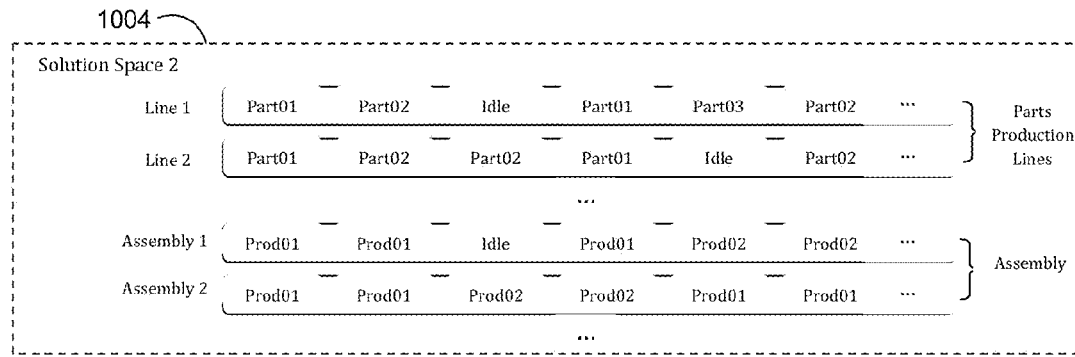
Figure 10:
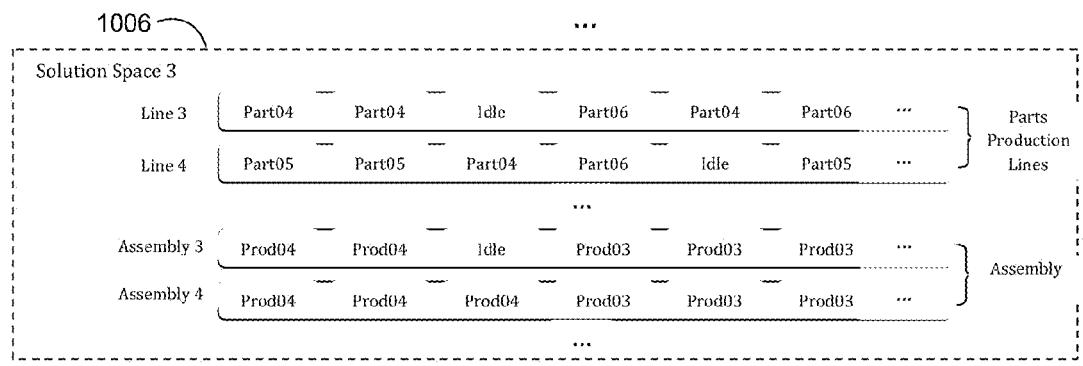

FIG. 10 shows an example chromosome representation 1000 of solution spaces 1002, 1004, 1006, in accordance with aspects of the disclosure.

In an implementation, as shown in FIG. 10, the example chromosome representation 1000 presents a simple example that shows how to narrow down a search space from a first search space 1002 to a second search space 1004 and/or a third search space 1006 by partitioning the problem based on hierarchical dependencies of products (prod), as shown with parts (part), lines (line), and assemblies (assembly).

For instance, referring to the first search space 1002, this scenario may assume 4 parts product lines and 4 parts assembly lines, wherein parts product line 1 and 2 may produce part01, part02, and part03, while parts product line 3 and 4 may produce part04, part05, and part06. Further, products 1 and 2 may be assembled by assembly line 1 and 2, while products 3 and 4 may be assembled by assembly line 3 and 4. Still further, products 1 and 2 may be sharing part01, part02, and part03, while products 3 and 4 may be sharing the part04, part05 and part06.

In this scenario, if the problem is not partitioned, then when an attempt to calculate a production schedule for next N producing cycle(s), the solution search space size may be $3^{4*N}2^{4*N}$. By applying partition techniques to the problem, the search space size of each sub-problem (e.g., the second and third search spaces 1004, 1006) may be configured with $3^{2*N}2^{2*N}$, and since there is two sub-problems, the total size of search space will be $2*3^{2*N}2^{2*N}$ in the second and third search spaces 1004, 1006.

More generally, if there are p part product lines $\{P_i\}$, each of them may produce $np_i$ kinds of parts, and if there are a assembly lines $\{A_j\}$, each of them may assemble $na_j$ kinds of products. When trying to schedule the production plan for the next N producing cycles, if a traditional format of GA such as a co-scheduling method is used, a solution to the problem is attempted in the search space of size:

$$\prod_i np_i^N \prod_j na_j^N$$

If the part producing lines, assembly lines, and all the parts and products are separated into M groups according to the dependency tree, a solution search space may have a size of:

$$\sum_{m=0}^{M} \prod_{P_i \in SP_m} np_i^N \prod_{A_j \in SA_m} na_j^N$$

In an example, where $\Sigma_m \text{size}(SP_m)=p$ and $\Sigma_m \text{size}(SA_m)=a$, by replacing a branch of a multiply-operation with an add-operation, the size of the search space may be significantly narrowed down.

In an implementation, this technique may be represented by the following example pseudo code.

---

PSEUDO CODE

1. FUNCTION Divide_and_Conquer_GA
2. BEGIN
3. Analyze the dependence between products; Assign the independent production resources (such as part production line, assembly line and etc.), and divide the solution space into independent sub-spaces. Here, suppose there are s sub-spaces.
4. Sub-space 1:
5. CALL FUNCTION PARALLEL_GA, find the best sub-solution and calculate the corresponding profit_1 in this sub-space
6. Sub-space 2:
7. CALL FUNCTION PARALLEL_GA, find the best sub-solution and calculate the corresponding profit_2 in this sub-space
8. ...
9. Sub-space s:
10. CALL FUNCTION PARALLEL_GA, find the best sub-solution and calculate the corresponding profit_s in this sub-space
11. Merge the sub-solutions from each sub-space, profit = profit_1 + profit_2 + ... + profit_s is the final profit for output
12. RETURN
13. END
1. FUNCTION Divide_and_Conquer_What_if_GA
2. BEGIN
3. Check the dependence tree to find out which sub-space is affected by the what_if operation. Here, for example, the sub-space x and y may be affected.
4. // re-run the PARALLEL_GA in the affected sub-space
5. Sub-space x:
6. CALL FUNCTION PARALLEL_GA, find the best sub-solution x
7. Sub-space y:
8. CALL FUNCTION PARALLEL_GA, find the best sub-solution y
9. Keep the other sub-spaces' sub-solution unchanged, merge the sub-solution x and y
10. RETURN
11. END

---

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
   a production scheduling manager configured to cause the at least one processor to schedule production events for each of a plurality of production resources used to manufacture one or more products relative to one or more time intervals while considering constraints related to product dependency trees for each of the one or more products, wherein the production scheduling manager includes:
      a production controller configured to determine the constraints related to the product dependency trees for each of the one or more products, wherein at least one of the constraints is based on additional product dependency trees constructed from at least two product dependency trees associated with at least one of the products, the additional product dependency trees configured to replace the at least two product dependency trees;
      a production coordinator configured to generate one or more potential production scheduling schemes for use of each production resource within the one or more time intervals and model each constraint as a production scheduling chromosome, the production coordinator further configured with a genetic algorithm handler to compare each of a plurality of production scheduling chromosomes relative to the constraints, to thereby output a selected subset of the plurality of production scheduling chromosomes, the selected subset based at least in part on the additional product dependency trees; and
      a production scheduling optimizer configured to generate a production schedule for the production events within the one or more time intervals based on the one or more potential production scheduling schemes for use of each production resource within the one or more time intervals the production scheduling optimizer further configured with the genetic algorithm handler to combine production scheduling chromosomes of the selected subset to reduce a search space for the genetic algorithm handler, the combination based at least in part on the additional product dependency trees.

2. The system of claim 1, wherein:
each product comprises one or more assemblies,
each assembly comprises one or more parts, and
each product dependency tree describes a hierarchical arrangement of the one or more assemblies for each product and the one or parts for each assembly used for producing each product.

3. The system of claim 1, wherein:
each product comprises one or more assemblies,
each assembly comprises one or more parts, and
at least one of the constraints related to the product dependency trees for each product comprises a part substitution possibility for one or more parts associated with each product.

4. The system of claim 1, wherein:
each product comprises one or more assemblies,
each assembly comprises one or more parts, and
at least one of the constraints related to the product dependency trees for each product comprises a product-part pairing relationship for one or more parts associated with each product.

5. The system of claim 4, wherein:
at least one of the constraints related to the product dependency trees for each product comprises another product dependency tree generated from the product-part pairing relationship for the one or more parts associated with each product.

6. The system of claim 1, wherein:
the products are divided into one or more product groups according to the product dependency trees for each product, and
each product group is independent of each other product group.

7. The system of claim 1, wherein:
the constraints are divided into one or more constraint groups according to each product dependency tree for each product, and
each constraint group is independent of each other constraint group.

8. The system of claim 1, wherein:
the products are divided into one or more product groups according to the product dependency trees for each product,
the constraints are divided into one or more constraint groups according to each product dependency tree for each product, and
each product group and each constraint group is independent of each other product group and each other constraint group.

9. The system of claim 8, wherein:
the production coordinator is further configured to generate the one or more potential production scheduling schemes by limiting the constraints related to the product dependency trees for each of the one or more products to a particular constraint group; and the production scheduling optimizer is further configured to generate the production schedule for the production events within the one or more time intervals based on the one or more potential production scheduling schemes generated with the particular constraint group.

10. The system of claim 1, wherein the production coordinator comprises the genetic algorithm handler and the genetic algorithm handler comprises:

a chromosome comparator configured to compare a plurality of production scheduling chromosomes, each production scheduling chromosome including the one or more potential production scheduling schemes for use of each production resource within the one or more time intervals while considering the constraints related to the product dependency trees for the one or more products; and a chromosome combiner configured to combine production scheduling chromosomes of the selected subset of the plurality of production scheduling chromosomes to obtain a next generation of production scheduling chromosomes for output to the chromosome comparator and for subsequent comparison therewith of the next generation of production scheduling chromosomes with respect to the constraints, as part of an evolutionary loop of the plurality of production scheduling chromosomes between the chromosome comparator and the chromosome combiner, wherein the production scheduling optimizer is further configured to monitor the evolutionary loop and select a selected production scheduling chromosome therefrom for implementation of the production schedule based thereon.

11. The system of claim 10, wherein the chromosome combiner is further configured to combine the production scheduling chromosomes including selecting pairs of production scheduling chromosomes and crossing over portions of each pair of production scheduling chromosomes to obtain a child chromosome of the next generation.

12. The system of claim 10, wherein at least a portion of the evolutionary loop is executed using parallel processes in which each generation of production scheduling chromosomes is divided into sub-groups for parallel processing thereof.

13. The system of claim 10, wherein the production scheduling optimizer is further configured to select the selected production scheduling chromosome after a predetermined number of generations of the evolutionary loop, or after determining that the selected production scheduling chromosome satisfies the constraints to a predetermined threshold.

14. A computer-implemented method, comprising:

scheduling production events for each of a plurality of production resources used to manufacture one or more products relative to one or more time intervals while considering constraints related to product dependency trees for each of the one or more products by:

retrieving information related to each production resource and evaluating each production event for each production resource to determine the constraints related to the product dependency trees for each of the one or more products, wherein at least one of the constraints is based on additional product dependency trees constructed from at least two product dependency trees associated with at least one of the products, the additional product dependency trees configured to replace the at least two product dependency trees;

generating one or more potential production scheduling schemes for use of each production resource within the one or more time intervals while considering the constraints related to the product dependency trees for each of the one or more products and model each constraint as a production scheduling chromosome, and using a genetic algorithm handler to compare each of a plurality of production scheduling chromosomes relative to the constraints, to thereby output a selected subset of the plurality of production scheduling chromosomes, the selected subset based at least in part on the additional product dependency trees; and generating a production schedule for the production events within the one or more time intervals based at least in part on the one or more potential production scheduling schemes and the plurality of production scheduling chromosomes for use of each production resource within the one or more time intervals and using the genetic algorithm handler to combine the plurality of production scheduling chromosomes of the selected subset to reduce a search space for the genetic algorithm handler, the combination based at least in part on the additional product dependency trees.

15. The method of claim 14, further comprising:

comparing a plurality of production scheduling chromosomes, each production scheduling chromosome including the one or more potential production scheduling schemes for use of each production resource within the one or more time intervals while considering the constraints related to the product dependency trees for the one or more products;

comparing each of the plurality of production scheduling chromosomes relative to the constraints, to thereby output a selected subset of the plurality of production scheduling chromosomes;

combining production scheduling chromosomes of the selected subset of the plurality of production scheduling chromosomes to obtain a next generation of production scheduling chromosomes for output to a chromosome comparator and for subsequent comparison therewith of the next generation of production scheduling chromosomes with respect to the constraints, as part of an evolutionary loop of the plurality of production scheduling chromosomes between the chromosome comparator and a chromosome combiner; and monitoring the evolutionary loop and select a selected production scheduling chromosome therefrom for implementation of the production schedule based thereon.

16. The method of claim 15, further comprising:

combining the production scheduling chromosomes including selecting pairs of production scheduling chromosomes and crossing over portions of each pair of production scheduling chromosomes to obtain a child chromosome of the next generation;

executing at least a portion of the evolutionary loop using parallel processes in which each generation of production scheduling chromosomes is divided into sub-groups for parallel processing thereof; and selecting the selected production scheduling chromosome after a predetermined number of generations of the evolutionary loop, or after determining that the selected production scheduling chromosome satisfies the constraints to a predetermined threshold.

17. A computer program product, the computer program product being tangibly embodied on a non-transitory computer-readable storage medium and comprising instructions that, when executed by at least one processor, are configured to:

schedule production events for each of a plurality of production resources used to manufacture one or more products relative to one or more time intervals while considering constraints related to product dependency trees for each of the one or more products, wherein the instructions, when executed by the at least one processor, are further configured to:

determine the constraints related to the product dependency trees for each of the one or more products, wherein at least one of the constraints is based on additional product dependency trees constructed from at least two product dependency trees associated with at least one of the products, the additional product dependency trees configured to replace the at least two product dependency trees;

generate one or more potential production scheduling schemes for use of each production resource within the one or more time intervals and model each constraint as a production scheduling chromosome, the one or more potential production scheduling schemes arranged using the additional product dependency trees to provide a plurality of forecasts configured to optimize production cost per product; and generate a production schedule for the production events within the one or more time intervals based on the one or more potential production scheduling schemes for use of each production resource within the one or more time intervals considering the constraints related to the product dependency trees for the one or more products.

18. The computer program product of claim 17, further comprising instructions that, when executed by the processor, are configured to:

compare a plurality of production scheduling chromosomes, each production scheduling chromosome including the one or more potential production scheduling schemes for use of each production resource within the one or more time intervals while considering the constraints related to the product dependency trees for the one or more products;

compare each of the plurality of production scheduling chromosomes relative to the constraints, to thereby output a selected subset of the plurality of production scheduling chromosomes;

combine production scheduling chromosomes of the selected subset of the plurality of production scheduling chromosomes to obtain a next generation of production scheduling chromosomes for output to a chromosome comparator and for subsequent comparison therewith of the next generation of production scheduling chromosomes with respect to the constraints, as part of an evolutionary loop of the plurality of production scheduling chromosomes between the chromosome comparator and a chromosome combiner; and monitor the evolutionary loop and select a selected production scheduling chromosome therefrom for implementation of the production schedule based thereon.

19. The computer program product of claim 18, further comprising instructions that, when executed by the processor, are configured to:

combine the production scheduling chromosomes including selecting pairs of production scheduling chromosomes and crossing over portions of each pair of production scheduling chromosomes to obtain a child chromosome of the next generation;

execute at least a portion of the evolutionary loop using parallel processes in which each generation of production scheduling chromosomes is divided into sub-groups for parallel processing thereof; and select the selected production scheduling chromosome after a predetermined number of generations of the evolutionary loop, or after determining that the selected production scheduling chromosome satisfies the constraints to a predetermined threshold.

* * * * *